United States Patent
Braganza et al.

(10) Patent No.: US 11,546,392 B2
(45) Date of Patent: Jan. 3, 2023

(54) IN-CONFERENCE QUESTION SUMMARY SYSTEM

(71) Applicant: Mitel Networks (International) Limited, London (GB)

(72) Inventors: Jonathan Braganza, Ottawa (CA); Kevin Lee, Kanata (CA); Logendra Naidoo, Ottawa (CA)

(73) Assignee: Mitel Networks Corporation, Kanata (CA)

( * ) Notice: Subject to any disclaimer, the term of this patent is extended or adjusted under 35 U.S.C. 154(b) by 122 days.

(21) Appl. No.: 17/114,009

(22) Filed: Dec. 7, 2020

(65) Prior Publication Data

US 2022/0182425 A1 Jun. 9, 2022

(51) Int. Cl.
*H04L 65/403* (2022.01)
*H04L 51/216* (2022.01)

(52) U.S. Cl.
CPC .......... *H04L 65/403* (2013.01); *H04L 51/216* (2022.05)

(58) Field of Classification Search
CPC ........................... H04L 65/403; H04L 51/216
See application file for complete search history.

(56) References Cited

U.S. PATENT DOCUMENTS

| | | | |
|---|---|---|---|
| 2008/0005269 A1 | 1/2008 | Knighton et al. | |
| 2016/0105566 A1* | 4/2016 | Klemm | H04L 12/1827 379/202.01 |
| 2019/0005127 A1 | 1/2019 | Alkov et al. | |
| 2020/0169543 A1* | 5/2020 | Vaughn | H04L 51/04 |
| 2020/0320478 A1* | 10/2020 | Crawford | G06Q 10/10 |
| 2020/0357297 A1 | 11/2020 | Kim et al. | |
| 2021/0367982 A1* | 11/2021 | Jain | H04L 65/403 |
| 2022/0141532 A1* | 5/2022 | Li | H04N 21/44222 725/14 |
| 2022/0150287 A1* | 5/2022 | Kasaba | H04N 7/157 |

* cited by examiner

*Primary Examiner* — Frantz B Jean
(74) *Attorney, Agent, or Firm* — Snell & Wilmer L.L.P.

(57) ABSTRACT

A communication system adapted to allow participants, during a collaboration event or session, to ask questions while also serving up or providing relevant context to the presenter. This can be done by the participant clicking anywhere on the screen of their display on their client device during an online presentation and then presenting their question (e.g., typing or otherwise entering their input) about that particular portion of the presentation. When a user clicks on their screen during the presentation, a new dialog will open with a screenshot of the point of the presentation that occurred as well as a dialog box to type in a question. When the participant submits their question, a question report can be created and sent to the server. This report may include a user identifier (ID), a timestamp of when the screenshot was taken, the coordinates of the click/selection location, and the question itself.

20 Claims, 6 Drawing Sheets

IN-CONFERENCE QUESTION SUMMARY SYSTEM

FIELD OF THE INVENTION

The present disclosure generally relates to electronic communication methods and systems including those utilizing the Internet and cloud-based solutions. More particularly, examples of the disclosure relate to electronic communication methods and systems that are adapted to facilitate the efficient presentation and answering of questions submitted during an presentation or event (e.g., a video conference call, a training session, a facilitated meeting, and the like) that is provided over a digital communications network (e.g., via the Internet as a cloud-based service).

BACKGROUND OF THE DISCLOSURE

Mobile and web applications allow users, such as operators of smartphones and other portable computing devices as well as tablets, laptop, notebook, and desktop computers, to perform a wide range of communication functions. In recent years, there has been a rapid expansion of the use mobile and web applications to allow two-to-many people in varying locations to communicate with each other in a concurrent manner or as a group.

For example, video conferencing and similar applications have rapidly expanded in popularity, and these applications allow the users to see each other and share information. These applications are being used for business and other meetings, for remote learning classes for primary schools, secondary schools, universities, and other organizations, for marketing presentations, for courtroom sessions, and for many other settings where one or more facilitators or presenters wish to present or share both visual and audio content and to interact with the participants (or application "users"). Such video conferencing applications often allow screen sharing and messaging to occur during the video conference or web-based meeting.

While providing many advantages for disseminating information, there remain unresolved issues with using video conferencing or similar applications. During a presentation to a group of people, some of the audience members or participants may have questions they wish to present. For example, they may wish to get further details about a particular portion of the presentation (e.g., not understand how to solve a problem in an online math class, have not heard the presenter's point during a business meeting, and so on) or may wish to provide input to the presenter (e.g., the "question" may be a counterpoint or an added statement that agrees with the content being presented at a particular time during a meeting or class). The portion related to the question may be presented by a slide, a live demo, a shared video clip, or simply by a speaker (such as the presenter/facilitator/teacher or another audience member/user) talking. Many video conferencing applications do not adequately support users (or audience members) presenting questions (which may include comments or nearly any input as the term is used herein).

In some presentations, the presenter(s) may provide a question and answer (Q&A) session at the end of the presentation. In this case, though, the audience members may forget their questions or the portion for which the question pertains as they must wait until the end of the presentation to ask their question (e.g., have a question about content presented in first few minutes of an hour long class or meeting). From a presenter's perspective, they may lose track of the context in which the question was framed or be confused as to which portion of the presentation the question pertains.

In other presentation formats, the users or audience members are allowed to interrupt (e.g., press a button on their client device to "raise their hands" or indicate they have a question or simply begin talking to ask their question) the presenter during the presentation, but this often is undesirable as it can disrupt the presentation and distract the presenter. In some cases, the users can submit questions during the presentation, but these "live" questions are often ignored or not addressed by the presenter in real time or are saved by the video conferencing application for review at the end of the presentation. Again, such a delayed Q&A approach can result in the context being lost making it more difficult for the presenter to provide an adequate or appropriate response.

Any discussion of problems provided in this section has been included in this disclosure solely for the purposes of providing a background for the present invention and should not be taken as an admission that any or all of the discussion was known at the time the invention was made.

BRIEF DESCRIPTION OF THE DRAWING FIGURES

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION OF EXEMPLARY EMBODIMENTS

The description of exemplary embodiments of the present invention provided below is merely exemplary and is intended for purposes of illustration only; the following description is not intended to limit the scope of the invention disclosed herein. Moreover, recitation of multiple embodiments having stated features is not intended to exclude other embodiments having additional features or other embodiments incorporating different combinations of the stated features.

As set forth in more detail below, exemplary embodiments of the disclosure relate to electronic communication systems, and corresponding methods performed by such systems, that can, for example, provide enhanced features for online communication conferences or sessions. For example, the new system (and corresponding methods) are particularly well suited for allowing participants of a video conferencing session to provide input, such as questions, to the presenter in an improved manner that is less disruptive to the presenter of the session and to its participants while retaining the context of the user input so as to allow more efficient and accurate responses to be generated during or after the video conferencing session. Hence, the new system may be thought of as "in-conference question summary system."

The new system (and associated method) allows participants, during a collaboration event or session, to ask questions (or provide other user input) while also serving up or providing relevant context to the presenter. This can be done by the participant clicking anywhere on the screen of their display on their client device during an online presentation and then presenting their question (e.g., typing or otherwise entering their input via their client device's input/output component) about that particular portion of the presentation. When a user clicks on their screen (or otherwise interacts with their display) during the presentation, a new dialog will open with a screenshot of the point of the presentation that occurred as well as a dialog box to type in a question.

The exact location of the screen that the user clicked upon or selected/indicated may be determined by the system and identified to the user in this dialog screenshot. The coordinates of the screen/display where they clicked will also be recorded and stored as part of the question/user input report. This is helpful in case the presenter moves to the next slide or other portion of the presentation as the pertinent portion in the presentation will still be visible to the user/participant in the separate dialog. When they submit their question, a question report can be created and sent to the server. This report may include a user identifier (ID), a timestamp of when the screenshot was taken, the coordinates of the click/selection location, and the question itself.

Once the server receives the question report, it may respond by associating it against the current meeting/presentation. The server may then act to examine the timestamp of other questions that have been submitted. If they are determined by the server to be close in time (e.g., within 30 seconds to 5 minutes or longer to suit a type of presentation and its content (or presenter's selection of a time window)), the server may then be configured to look at the coordinates of the screen location and, if they are close in proximity to another input question, it will look at the question, e.g., using a natural language processing (NLP) tool or the like, to determine if the questions are related (e.g., determine if keywords are the same or similar based on the analysis). If determine to be related questions, the server may present only one of the questions (e.g., the one that is first or last in time) or combine the two (or more) questions into a single question to avoid duplication (while, in some cases, indicating that multiple participants who each may be identified to the presenter have asked this question or had this similar input).

From the organizer's or presenter's application (e.g., a collaboration utility or application ("app") running on their client device), they will have the ability to view the question report list at any time. The question report list may be served to their device by the server and be automatically updated with any question reports received and processed during the duration of the presentation as well as afterward during a more conventional Q&A portion of the presentation. In some default operating modes, the question report list is ordered by the screenshot timestamp. Then, when the presenter is viewing a question report, the presenter can see the screenshot which includes when the user clicked (e.g., time the question was raised by the participant) as well as the question/user input itself and who submitted it (the participant's ID). The presenter can then answer all or a subset of the questions knowing the context (timing and presentation content related to the question) of each question.

Figure 1:
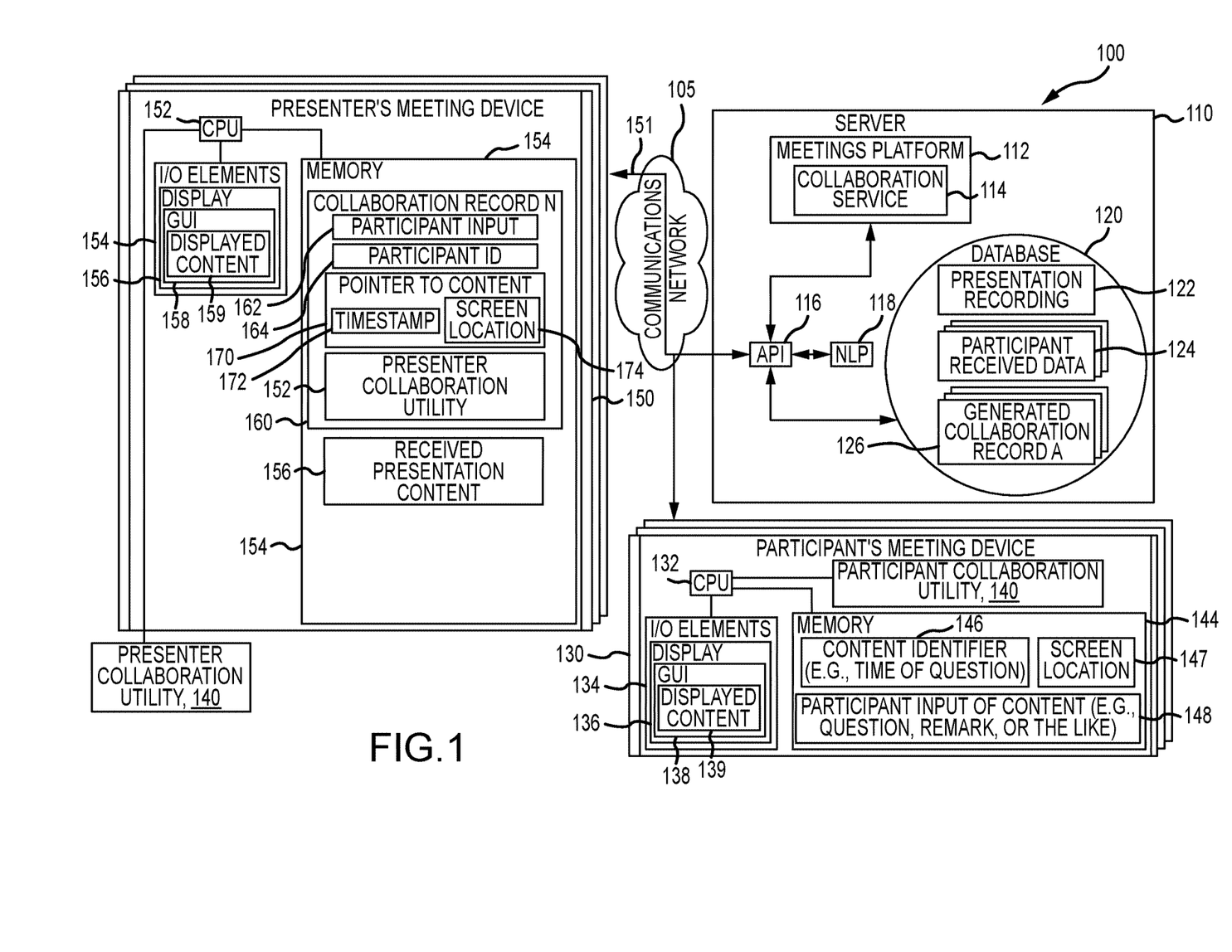
FIG. 1 illustrates an electronic, cloud-based communication system adapted to provide enhanced collaborative communications including in-conference (or in-session) question summaries in accordance with exemplary embodiments of the disclosure.

With this overview in mind, FIG. 1 illustrates an electronic, cloud-based communication system 100 adapted to provide enhanced collaborative communications including in-conference (or in-session) question summaries in accordance with exemplary embodiments of the disclosure. As shown, the system 100 includes a web server 110 communicatively linked via its application programming interface (API) 116 and a digital communications network 105 in a wired or wireless manner shown with arrows 131, 151 with one-to-many participant meeting (or client) devices 130 and one or more presenter meeting (or client) devices 150.

The server 110 may be any useful server device (or devices as the functionality may be provided with two or more such devices) as well known in the arts for hosting or facilitating sharing of content between the presenter's device 150 and the participant's devices 130. The client devices 130 and 150 can be or can include any suitable device with wired or wireless communication features that can connect to network 105 and e-mail server. For example, devices 130 and 150 can include a wearable device, a tablet computer, a wired phone, a mobile phone, a personal (e.g., laptop or desktop) computer, a streaming device, such as a game console or other media streaming device, or the like. The server 110 has one or more processors (not shown) that run code or software and/or execute instructions to perform the functions of a meeting platform 112, and the presenter meeting device 150 and each of the participant meeting devices 130 may run a local app or plugin for the meeting platform 112 to allow content to be shared during a video conferencing session or an online presentation.

The meetings platform (or meetings hosting module) 112 may include a collaboration service 114 or be able to call this service 114 during a hosted presentation or content sharing session/event to perform the functions described herein. The collaboration service 114, in turn, may include or call an NLP module 118 on the server 110 (or accessible via network 105), to process two or more questions to determine if they should be combined due to the relatedness of their content. The server 110 is also shown to include data storage including a database 120 (which may also be distributed in some cases on network 105). The database 120 is used to store a presentation recording 122 (e.g., a file containing the content presented during a meeting or training session/event) as well as records 124 of data received from participants (e.g., a user ID, a question, a timing of a question, and a location on their display or its screen associated with the question). The database 120 also stores generated collaboration records (or question reports) 126 created by the collaboration service 114 for each received question (or for combinations of such questions if combined based on feedback from the NLP module 118). During operations of the system 100, these records/reports 126 are transmitted by the collaboration service 114 to the presenter meeting device 150 (or are accessible by this device) for use in an operator of such a device 150 in responding to the user input/questions.

As shown, each client device 130 includes a processor 132 executing code or instructions (or running software) to provide a variety of functions including a participant collaboration utility 140. The processor 132 also manages operations of the device's I/O elements 134 that may be include a display 136 as well as input devices such as a touchscreen (which may be part of the display 136), a keyboard, a mouse, voice recognition devices, and the lie to allow the user to provide input including a content selection (e.g., touch or click the screen of display 136 during a presentation to indicate a portion of the presentation) and user input (e.g., a question or remark or similar content related to the content selection). The display 136 is operated during the session/event hosted by platform 112 to display presentation content 139 (e.g., a slide, frames of a video, and so on) while concurrently speakers or audio output components in the I/O elements may output corresponding audio content (e.g., speaking by an operator the presenter meeting device 150).

The participant client device 130 also includes memory or data storage 144 that has its access managed by the processor 132. During a collaboration session or event (e.g., a video conferencing class or meeting), the participant collaboration utility 140 may functions to monitor for any user interaction with the displayed content 139. When interaction such as a user touching their touchscreen display 136 or clicking their mouse at a location in the screen/display 136 is detected, the utility 140 acts to store a screen location 147 in memory 144 associated with the selection (or user click). Also, the utility 140 acts to determine and store an identifier 146 for the content 139 displayed when the user selection or clicking occurred, and this may be a time of the selection.

The collaboration utility 140 may communicate this information (as shown as data 124 in database 120) to the server 110 for processing by the collaboration service 114 for the service 114 to provide a new dialog or the client-based utility 140 may respond by generating a new dialog, in place of or over (or in a split window or the like) or new displayed content 139 that includes a screenshot of the content associated with the identifier 146 (e.g., slide or frame shown in presentation stream when user selection/clicking occurred) along with a dialog box into which the operator of the participant client device 130 may enter their user input 148, which may take the form of a typed or spoken question, remark/comment, or the like related to the presentation content identified by the content identifier 146.

This new dialog may include a visual indicator (e.g., a dot, a circle, an "X", or the like) of the screen location 147 captured by the utility 140 from the user's input/selection via the I/O elements 134. The user may accept this location and the resulting selection of a portion of the displayed content 139 of the presentation to associate with the comment/input 148 or they may be allowed, in some embodiments, to move the visual indicator on the screenshot so as to better associate their question with the correct portion of the displayed content (e.g., move the colored dot or circle to a different portion of a displayed slide to provide more accurate context for their question).

The presenter meeting or client device 150 also includes a processor 152 running code or software to provide a presenter collaboration utility 152 that interacts with the collaboration service 114 to provide the new in-conference question summarizing features described herein. The device 150 also includes I/O elements 156 includes input devices to allow a presenter to select and view differing questions and associated context from the participant client devices 130. The I/O elements 154 include a display 156 upon which a generated GUI 138 is displayed that presents or displays content 139, which may include the presentation content of the current session/event they are leading and which may include a question report list from the collaboration service providing links to question reports/records (that provide question content along with an ID of the person who submitted the question as well as context including the portion of the content associated with that question).

To this end, the memory 154 of the presenter client device 150 may store presentation content 156 received from the collaboration service 114 that is associated with a participant's question. In some cases, this content 156 may be a screenshot associated with a question or it may be a plurality or set of slides, frames, or the like of the recorded presentation 122. For example, a user may submit a question at 1 pm during a presentation, and the received presentation content 156 may include a predefined number of slides on either side of the slide that was shown at 1 pm or may include a video recording that includes the frame associated with 1 pm (e.g., provide a video recording of the presentation from 12:58 pm to 1:02 pm or some other time window) so as to provide additional context related to the question to the presenter rather than a single screen shot. The received presentation content 156 also may include audio in additional to visual content to assist the presenter in understanding the specific context of the question or other user input during the presentation.

Additionally, as shown stored in memory 154, the collaboration service 114 provides the presenter meeting device 150 with a collaboration record or question report 160 for each question (or combination of question) from the participants (operators of devices 130), which may be organized as a question report list in the displayed content 159 of their GUI 138. Each record 160 provides the operator of the device 150 with a participant's input (e.g., question) 162 in an "as received" form or after some modifications by the NLP tool 118 to combine two or more questions into a single one. The record 160 also includes a participant ID 164 as well as a pointer to the content 170 of the presentation. The pointer 170 may provide a timestamp 172 in the presentation to allow the utility 152 to retrieve the correct content in the received presentation content 156 (or this function may be provided by service 114) and a screen location 174 to further identify the portion of the displayed content at a particular point in time of the presentation that is related to the user input/question 162. The displayed content 159 may be modified to show a screenshot of the presentation content 156 associated with the timestamp 172 with a visual identifier of the screen location 174 to assist the presenter in determining the portion of the content associated with the question/user input 162.

Figure 2A:
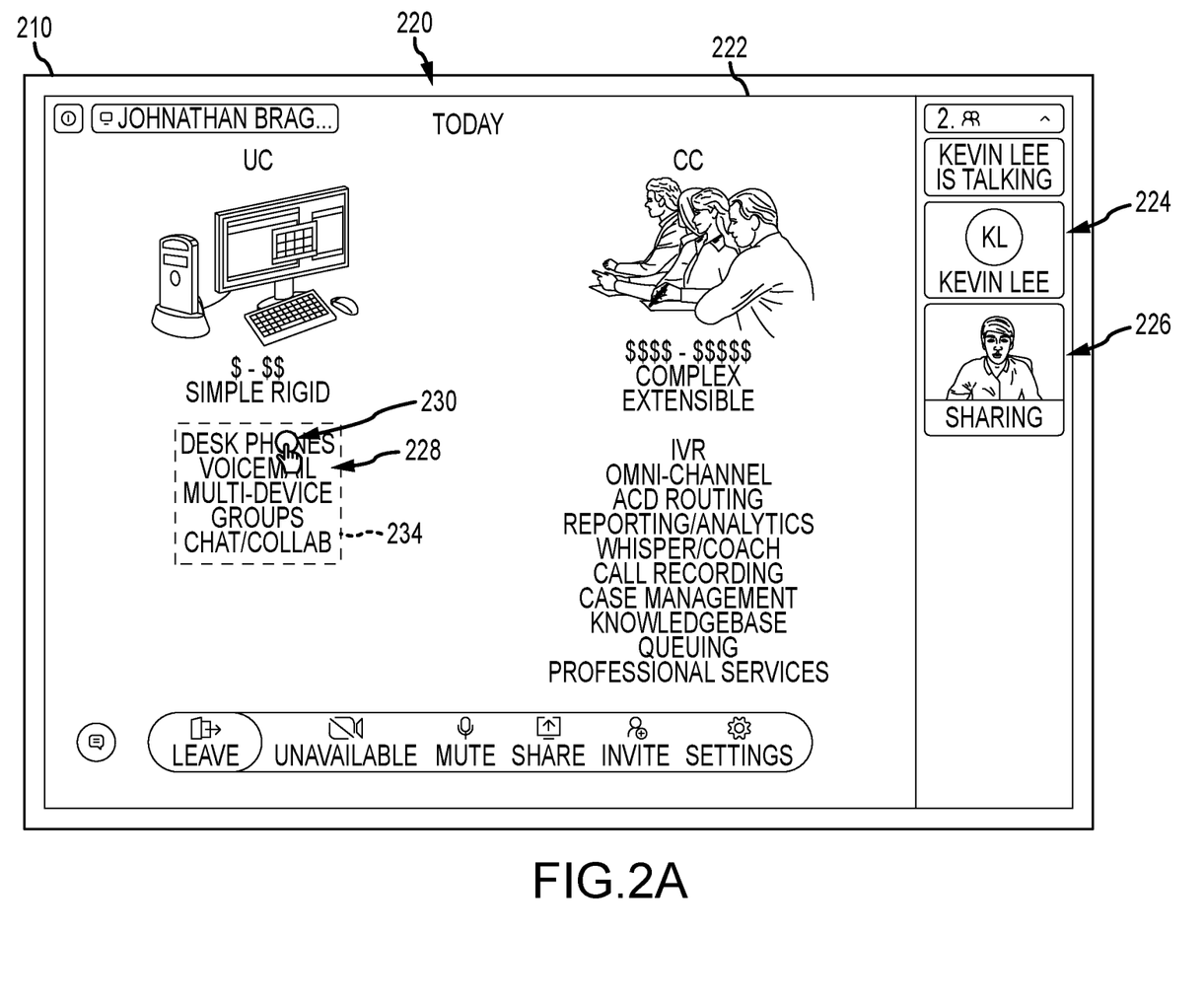
FIGS. 2A and 2B illustrate a display device operating to display collaboration session content (a slide during a presentation or the like) and to display a dialog to facilitate a participant entering a question.
Figure 2B:
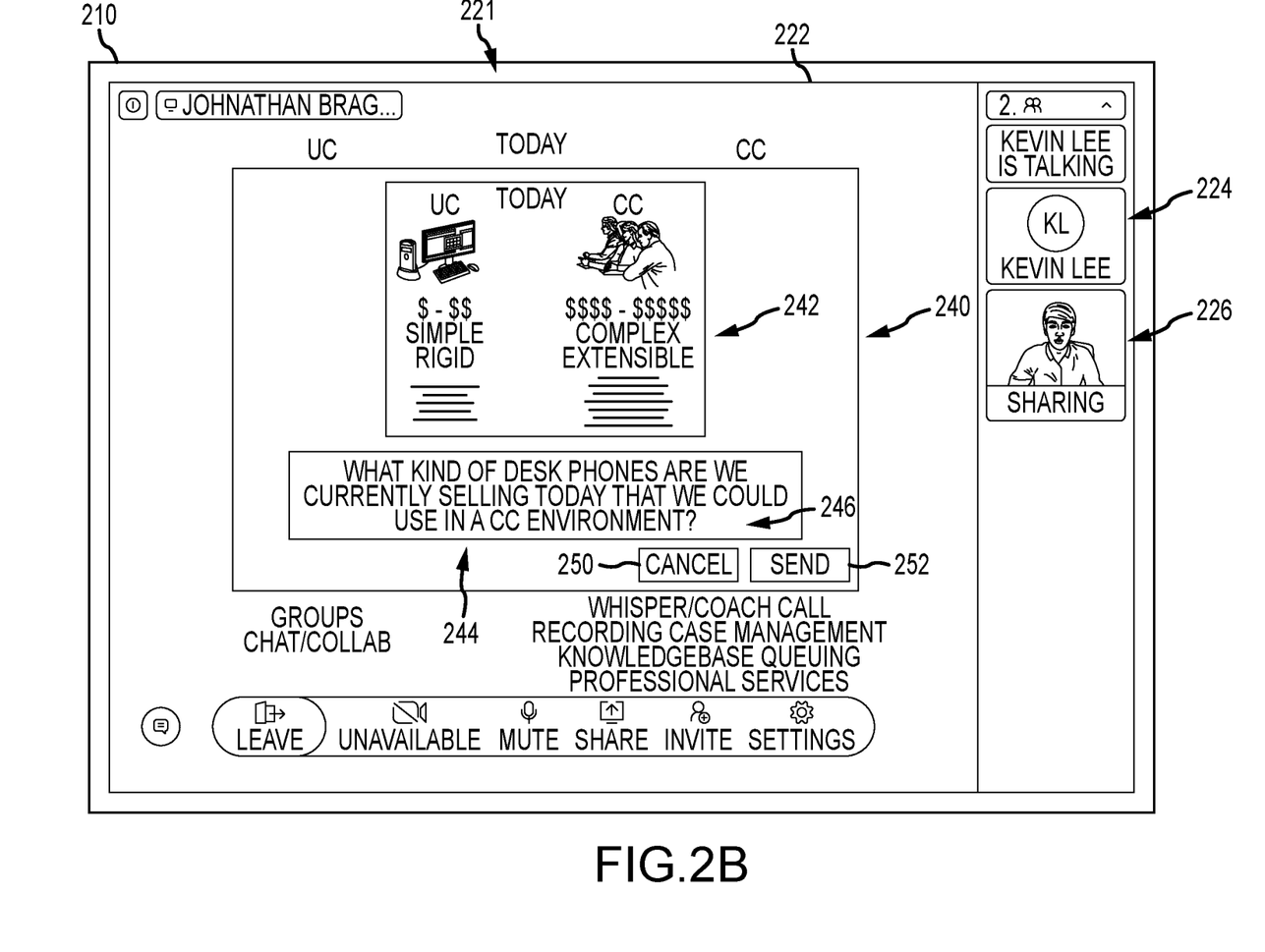

At this point in the description, it may be useful to explain operations of a communications system (such as system 100 of FIG. 1) during a collaboration session or event (e.g., during a video conferencing session to support a business meeting or online learning class or the like). FIGS. 2A and 2B illustrate a display device 210 operating, respectively, to display collaboration session content (a slide during a presentation or the like) and to display a dialog to facilitate a participant entering a question.

As shown in FIG. 2A with screenshot 220, the display 210 is operated, during a collaboration session or presentation hosted by a meeting or video conferring platform (such as platform 112 of FIG. 1), to display presentation content 222 in a first part of the display 210 (or screen of the display 210). Concurrently, the display 210 may be operated to provide in its GUI shown in screenshot 220 to provide boxes or windows of supplemental content such as a first box 224 identifying a presenter (e.g., with their name or with their name and a still or video (live) image) and a second box 226 identifying the participant operating the client device with the display 210 (again, with an identifier or identifier and name). The presenter client device (not shown) would be operated to provide shared content (e.g., content 222 in the first part of the display 210) and, in some cases, supplemental information as shown in boxes/windows 224, 226.

In a collaboration system (such as the system 100 of FIG. 1), the display 210 is also operated to monitor for user input indicating selection of a portion of the content in the first part of the screen or display 210 that they wish to comment upon or to ask a question regarding. As shown, the user/operator has operated their I/O devices (e.g., a mouse) to move a cursor 228 over a subset or portion 234 of the content in the first part of the display 210. The collaboration system detects when the user selects or clicks on this location of the cursor 228 and, in response, modifies the GUI to indicate with a selection location indicator 230 (here a dot or solid circle). The selection by the user is an indication that they want to transmit user input to the presenter of the content 222.

As shown in FIG. 2B with the screenshot 221, the collaboration system operates the display 210 to update the GUI to continue to show the present content of the collaboration session or presentation 222 and to also generate and present a new dialog (or dialog box or window) 240. In this dialog 240, a thumbnail 242 of the presentation or session content at the time the user made their selection is provided with the display 210. In the thumbnail 242, the selection location indicator 230 is shown, and, from this, a leader line 245 is provided to a dialog box 244. The use is able to enter user input (e.g., a question, a comment, or other input) 246 in this box 244 such as by typing, by use of voice input devices, and the like. When done entering the user inputted content 246, the user may select in this GUI shown in screenshot 221 via button 250 to cancel the input or via button 252 to send the user input 246 (along with their ID and the location of the cursor 228 at the time the question/input was initiated) to the web server running the collaboration service (service 114 of the meeting platform 112 in FIG. 1). After the selection of the send button 252, the display 210 is operated again in the operating mode of FIG. 2A (e.g., to display the present session/presentation content 222 and to remove the dialog 240).

Figure 3:
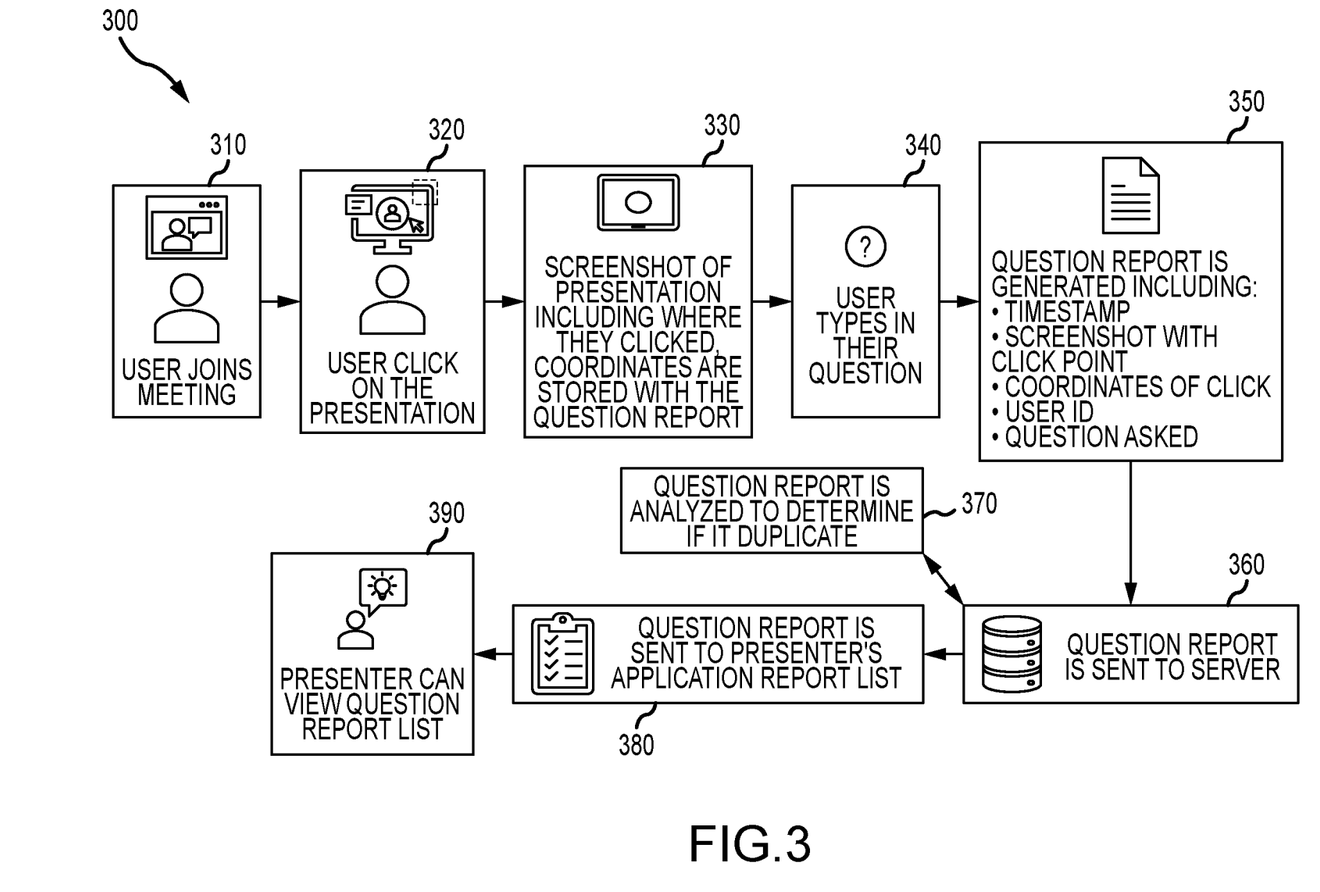
FIG. 3 is a flow diagram of a method of in-conference question summarization as may be performed by a communication or collaboration system of the present description such as the system shown in FIG. 1.

FIG. 3 is a flow diagram of a method 300 of in-conference question summarization as may be performed by a communication or collaboration system of the present description such as the system 100 shown in FIG. 1. An initial process or step may include downloading collaboration utilities or plugins on each client device (presenter and participant devices) to enable sharing of session or event content and to enable the client-based and web or cloud-based collaboration service components to work together to monitor the session/event and to provide the question summarizing functions described herein.

The method 300 then includes at 310 the step of the participant or user of a session/event joining the session/event (or "meeting"), which typically will involve video conferencing. In step 310, their display may be operated to display content being presented or shared by the presenter/facilitator of the meeting. In step 320, the user clicks on the displayed presentation content, e.g., moves the cursor to a location on the display's screen and selects (e.g., left clicks on their mouse) the content at that location to mark as being related to their user input.

The method 300 continues with step 330 involving the display device of that user being operated to display or present (such as by operations of the client-based collaboration utility alone or in combination with the web-based collaboration service) a screenshot of the presentation including where (the location) they clicked. The coordinates on the screen of the click/selection of content are stored at least temporarily on the client device and later in web server in a question report generated for this user's input or question. In step 340, the method 300 continues with the user typing in (or otherwise entering) their question (or user input) such via a presented dialog box in the GUI provided in the display device.

The question report is generated, by the client-side utility or by the web-based collaboration service. The question report or collaboration record may include a timestamp (or other identifier of the user-selected content in the presentation), a screenshot with a click point, coordinates of the click, the user's ID, and the question asked by the user. The question report is then transmitted over the communications network to the server (e.g., one hosting the meeting/session/event and running the collaboration service or one running the collaboration service in a distributed manner).

In step 370, the question report is analyzed to determine if it is a duplicate or is cumulative of another already received question from another user. This may involve comparing the content associated with the question and/or the timing of the question. In other words, two questions may be considered potentially related and requiring further analysis if they both fall within a predefined time window within the presentation/event, e.g., two timestamps within 5 minutes of each other, within 3 minutes of each other, within 30 seconds of each other, or the like. Typically, the content of the presentation associated with the click/selection location should be matching, too, prior to further analysis for a duplicative or cumulative question. The analysis may, if timing and content are determined to be "matching," involve comparing the content of the user input/question to determine whether an adequate correlation is found to combine the two questions or if they should be kept as separate records, and such analysis may be involve NLP processing (e.g., with NLP module 118 of system 100 of FIG. 1 and as explained in more detail below).

If not a duplication at 370, the question report is retained in the server database at 360, and the method 300 continues at 380 with the question report being sent to (or updated on) the presenter's client device as a question report list showing all question reports received so far during the ongoing presentation (or at the end of the presentation in some cases). The question report listing may include a count of how many have asked this question when duplicates are identified in step 370 and may include the user IDs of those submitting the questions. In step 390, the presenter may have their GUI in their display device updated so they can view the question report list along with or separately from the presentation content they are currently sharing/presenting. The presenter in step 390 may select a question to answer and be provided the context of the question such as a screenshot of the content corresponding with the timestamp/user's content selection and a click location as well as the question/user input content.

Figure 4:
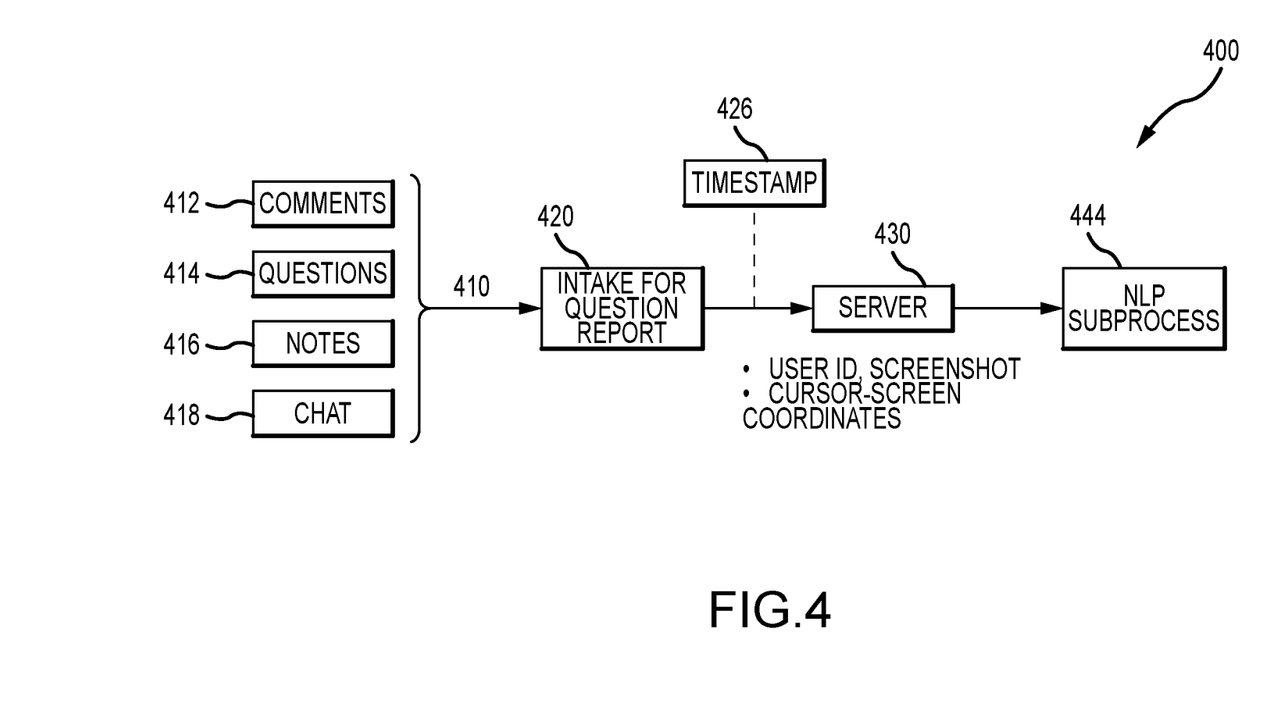
FIG. 4 is another flow diagram of a method of in-conference question summarization as may be performed by a communication or collaboration system of the present description similar to that shown in FIG. 3 but showing the user of NLP subprocessing.
Figure 5:
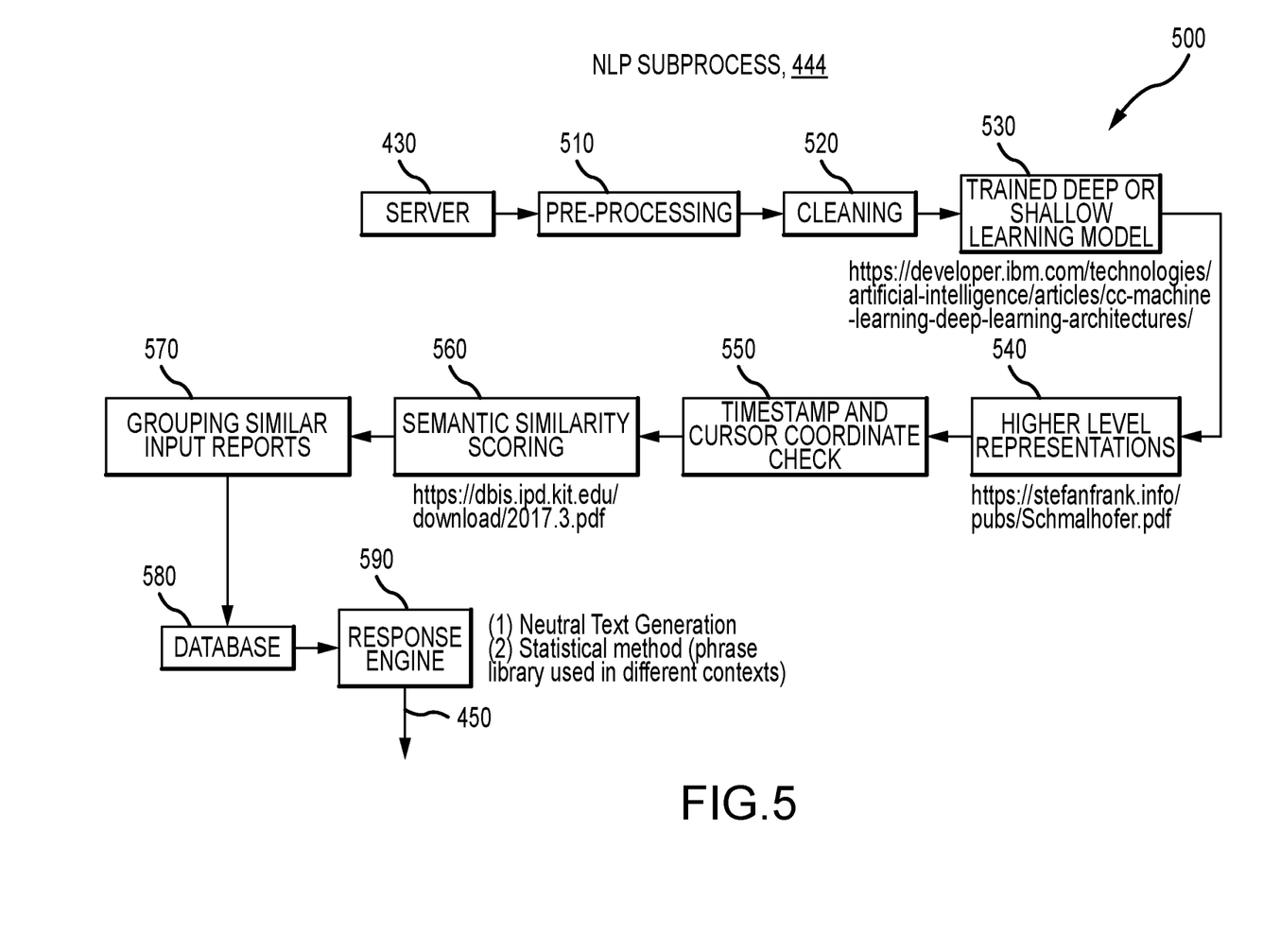
FIG. 5 is a flow diagram showing an exemplary implementation of the NLP subprocessing that may be used in the methods of FIGS. 3 and 4 and as may be carried out by the operation of the system of FIG. 1.

FIG. 4 is another flow diagram of a method 400 of in-conference question summarization as may be performed by a communication or collaboration system of the present description similar to that shown in FIG. 3 but showing the user of NLP subprocessing at 444. FIG. 5 is a flow diagram showing an exemplary implementation of the NLP subprocessing 444 that may be used in the methods of FIGS. 3 and 4 and as may be carried out by the operation of the system 100 of FIG. 1.

In the method 400, the client-side collaboration utility acts to collect user input (or a "question") 410, and this input 410 may include a variety of user-provided content including comments 412, questions 414, notes 416, and chat 418. The utility processes this as part of an intake process/step 420 for the question report that is transmitted to the server 430 hosting the presentation/session/event (e.g., an online content sharing with video conferencing). The intake 420 includes capturing a timestamp 426 defining when in the presentation the user indicated (e.g., by clicking on their screen showing the presentation content) they wished to provide user input. The server 430 may also store, as part of the question report, the user ID for the participant/user providing the input 410, a screenshot of the presentation at the time in the presentation corresponding with the timestamp 426, cursor screen coordinates, and the user input 410 (or portions thereof).

The question report 420 is then provided by the server 430 to an NLP subprocess 444 for analysis/processing to determine whether the question/user input is unique or whether it is duplicative or cumulative to one or more previously received user inputs in question reports stored by the server 430 during the presentation/session/event. The processed question report is then output at 450 for delivery as part of a question report list to the client device of the presenter, e.g., with duplicates deleted or combined with others, a count increase of number of times the question/content has been presented, and a listing of user IDs associated with the matching content.

In the method 500, the server 430 feeds the question report, and its components, to the NLP subprocess 444 for pre-processing at step 510. The pre-processing 510 may involve text tokenization, normalization, noise removal, and lemmatization, and/or involve NLP pre-processing as described at https://nlp.stanford.edu/IR-book/html/htmledition/tokenization-1.html or the like. The NLP subprocess 444 then proceeds at 520 with cleaning of the content to be processed (of the user input/question). The cleaning 520 removes stop words (e.g., $, a, the, an, this, and so on), special characters, numbers, and the like. There may be exceptions when the queries or comments are idiomatic or terse, and, in these cases, the cleaning 520 may retain these as they may be useful for providing full context to understanding the user inputted content/question.

The NLP subprocess 444 continues at 530 with applying a trained deep or shallow learning model to the content of the user input. This NLP analysis is understood in the art with exemplary implementations and description provided, for example but not as a limitation, at https://developer.ibm.com/technologies/artificial-intelligence/articles/cc-machine-learning-deep-learning-architectures/. Next, at 540, the NLP subprocess 444 generates higher level representations using the output from steps 510, 520, and 530. An example of such NLP processing can be found at http://stefanfrank.info/pubs/Schmalhofer.pdf, and with regard to the step 540: (a) cleaned and pre-processed text is fed into deep neural networks of variable depth; (b) by variable depth, each neural layer abstracts a different meaning from the analyzed input; (c) generally, the method 444 leverages activation outputs because it provides higher level abstraction of the varied inputs; (d) the higher level abstraction makes the representations of linguistic/semantic elements simpler; (e) these vector representations can be shallow (Word2Ved, Glove, and the like), contextual (e.g., USE), or averaged (deep averaging network or the like) depending on the use case; and (f) unsupervised clustering algorithms can then be used to divide these representations (questions) into logical groupings.

With the output of step 540 generated, the question summarizing method 500 continues at 550 with a check of the timestamp and cursor coordinates with other previously processes question reports (user inputs/questions). The closeness of timestamps (e.g., two (or more) questions entered during a presentation within a predefined time window) and/or coordinates (another set of coordinates within a predefined radius of the present question's coordinates) allows for better grouping of similar questions. If the check at 550 indicates a possible duplication (e.g., content being "questioned" is matching or nearly so), the method 500 continues at 560 with scoring of the semantic similarity between the presently being processed user input question and a previously received and processed user input question (with matching timestamp and/or cursor coordinates).

If the scoring indicates a likely duplication or cumulation of content between the two questions (as may be performed as described, for example, at https://dbis.ipd.kit.edu/download/2017.3.pdf) the method 500 continues at 570 with grouping of the similar question reports. Questions may be grouped according to mutual similarity/dissimilarity of word/sentence level representations of the questions. The groupings can vary according to the type of similarity scoring used in step 560 (e.g., Euclidean distance, L2 norm, Jaccard, and the like). In step 580, the database managed by the collaboration service server is updated to reflect the grouping 570 (or decision in method 500 not to group as may be made at 550 if the check fails or at 560 if scoring fails to indicate an adequate similarity). The method 500 continues at 590 with generation of a response/output 450, with a response engine in the NLP module, which may include neural text generation or a statistical method (phrase library used in different contexts) and/or may be carried out as discussed at https://cs.stanford.edu/~zxie/textgen.pdf.

As will be understood by those skilled in the arts, many companies use a video conferencing or meeting tool when broadcasting a presentation to a large group of people. Typical use cases would be audio or video conferencing where content is presented and shared with others including, but not limited to, townhall presentations, business updates, or product demonstrations. During the presentation, a member of the group may have questions about a specific portion of the presentation. With tools prior to the present description, the user could raise their hand during the presentation or type in a question into the system. The presenter would then be shown a list of all the questions that were asked. Depending on how long the presentation was, the presenter may not have a context of what the question is related to in the presentation content. If users are only allowed to ask their questions at the end of the presentation, they may forget their question because of the length of the presentation.

The present method and system provides a way to allow audience members to ask questions while also providing a context for the questions to the presenter. At any time during the presentation, the user can choose to click anywhere on their screen. The client application will take a screenshot of the current state of the presentation being shared, whether this is a video, slide, demonstration, or other shared content displayed on the screen of their client device. The client application will also record the placement of the user's click (cursor location) on the presentation screen. The timestamp of when this occurred is also recorded. A new dialog will then open that has a preview of the screenshot depicting the click point using, for example, a colored circle whose location was determined using the placement of the user's cursor (via a mouse, touchscreen, or the like) at the time at which they clicked/selected the input to mark for a question/user input. There may also be a dialog box allowing the user to ask/enter a question. Once the user has typed (or otherwise entered) their question and submitted it, a question report is sent that includes a user ID, a timestamp of when the screenshot was taken, the screenshot with the user' click point, and the question itself.

When a presentation/meeting starts, the server hosting the meeting (or another providing the collaboration service) will automatically create an empty question report list against the meeting (or linked to the session/event) typically using the meeting ID to link the report list to the meeting. The server is then ready to accept incoming question reports from participants' client devices. Once a user/participant has sent their question report, it is received by the server. If the question report list is empty, this question report is automatically added to the empty list.

Otherwise, in most embodiments, the question report will be compared (such as via NLP analysis) against all the exiting question reports in the list to see if there has already been a similar question asked by another user. For example, the timestamp will be analyzed to determine where the question fits chronologically in the received questions and if there are other questions asked around the same timestamp (e.g., within a predefined time window). If a question is determined to be in the same timeframe or window, the screenshot and click location coordinates will be compared to one another to determine if they too are similar. If so, then the question/user input content will be analyzed using NLP or other techniques to determine if there are shared key words and/or topics. If the question is found to include similar content or to be a duplicate (or at least cumulative), the question is associated to the matched question report and marked as duplicate. If the question is not duplicative, it is inserted into the ordered question report list at the appropriate spot based on its timestamp (list questions chronologically in many applications).

In the presenter's view of the presentation on their client device, they may be allowed via their GUI to operate a toggle button (or other input element) to allow the presenter to show or hide questions that have been asked during (or after) their presentation. The question report list is updated on an ongoing basis to be current (or nearly real-time) during the presentation as the server receives more questions from other users. The presenter can view a question that has been asked by clicking on a show button. If the presenter would prefer to only see questions during a post-presentation Q&A period, they can choose in their GUI to keep the question report list hidden and view them at their leisure such as after they complete sharing of content.

The list that the presenter is shown is ordered by the timestamps and may include a thumbnail of the captured screenshot and/or the question/user input content. If the presenter clicks on any question in the list, a new dialog box will, in some embodiments, be shown with the full screen shot, question, and the user's name (which may be determined by the system using the user's ID) for the participant who asked the question/provided the user input. If there are duplicate questions associated with the question report chosen, a button may be provided in the presenter's GUI to allow them to view the duplicate questions. When viewing a duplicate, the presenter may be enabled via their GUI configuration to choose to remove the duplicate tag if they find the questions to be different and/or to be directed toward differing content. Once the presenter has answered the chosen question, their GUI may be further configured to allow them to click or select an answered button to specify that they have already answered this question, and the question report list may be updated to indicate which questions have been answered or at least discussed or addressed by the presenter.

As used herein, the terms application, module, analyzer, engine, and the like can refer to computer program instructions, encoded on computer storage medium for execution by, or to control the operation of, data processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of the substrates and devices. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., solid-state memory that forms part of a device, disks, or other storage devices).

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. The features of the various embodiments may stand alone or be combined in any combination. Further, unless otherwise noted, various illustrated steps of a method can be performed sequentially or at the same time, and not necessarily be performed in the order illustrated. It will be recognized that changes and modifications may be made to the exemplary embodiments without departing from the scope of the present invention. These and other changes or modifications are intended to be included within the scope of the present invention, as expressed in the following claims.

We claim:

1. A method of summarizing questions during an online conference comprising:
   over a communications network, hosting a collaboration session in which digital presentation content is shared by a presenter client device with participant client devices communicatively coupled to the communications network;
   with a server linked to the communications network, receiving a question report from one of the participant client devices, wherein the question report includes identification data of a portion of the presentation content and user input content associated with the portion of the presentation content;

with the server, transmitting the question report to the presenter client device for access by an operator of the presenter client device during the collaboration session; and prior to the receiving a question report from one of the participant client devices, displaying the presentation content on a display screen of each of the one of the participant client devices, responding to a user interaction with the display screen during the displaying by collecting a timestamp and a cursor coordinates associated with the user interaction and further by displaying a screenshot of the presentation content displayed at a time matching the timestamp along with a dialog box, receiving the user input content via the dialog box, and transmitting the question report to the server including the timestamp, the cursor coordinates, the screenshot, and the user input content.

2. The method of claim 1, wherein the identification data includes a timestamp and a screenshot of the presentation content displayed on a display of the one of the participant client devices at a time matching the timestamp.

3. The method of claim 2, wherein the identification data further includes cursor coordinates on the display corresponding to a user interaction with the presentation content of the screenshot at the time matching the timestamp.

4. The method of claim 3, further including modifying the screenshot to include a visual marker at a location based on the coordinates.

5. The method of claim 1, further comprising comparing the received question report with a previously received question report to determine whether the received question report is duplicative of the previously received question report and when duplicative combining the received question report with the previously received question report prior to the transmitting step.

6. The method of claim 5, wherein the comparing step comprises performing natural language processing (NLP) on the user input content to determine whether user input content in the previously received question report is a match.

7. The method of claim 5, wherein the comparing step comprises determining whether the timestamp is within a predefined time window containing a timestamp of the previously received question report.

8. The method of claim 5, wherein the identification data further includes cursor coordinates on the display corresponding to a user interaction with the presentation content of the screenshot at the time matching the timestamp and wherein the comparing step comprises determining whether the coordinates are within a predefined distance from cursor coordinates in the previously received question report.

9. The method of claim 1, wherein the user input content includes at least one of a question, a comment, a note, and chat.

10. An electronic communication system for summarizing questions during an online conference comprising:

a web server including a meetings platform hosting an online communications session on a digital communications network;

a presenter client device sharing presentation content in the online communications session;

a participant client device communicatively coupled to the digital communications network receiving the presentation content and displaying the presentation content upon a display, wherein the participant client device runs a collaboration utility monitoring for a user interaction with the display during the displaying of the presentation content and, in response, to display a screenshot of the presentation content and a dialog box for receiving user input content;

a collaboration service on the web server receiving a question report from the participant client device comprising the user input content and, in response, transmitting the question report to the presenter client device for display in a question report list; and prior to receiving the presentation content, displaying the presentation content on a display screen of each of the one of the participant client devices, responding to a user interaction with the display screen during the displaying by collecting a timestamp and a cursor coordinates associated with the user interaction and further by displaying a screenshot of the presentation content displayed at a time matching the timestamp along with a dialog box, receiving the user input content via the dialog box, and transmitting the question report to the server including the timestamp, the cursor coordinates, the screenshot, and the user input content.

11. The electronic communication system of claim 10, wherein the collaboration utility on the participant client device further captures a timestamp when the user interaction with the display is detected and wherein the question report transmitted to the presenter client device comprises at least one of the timestamp and a screenshot of the presentation content displayed on the participant client device at time of capture of the timestamp.

12. The electronic communication system of claim 10, wherein the collaboration utility on the participant client device further captures cursor coordinates associated with the user interaction with the display, wherein the screenshot includes a visual marker displayed at the cursor coordinates, and wherein the question report transmitted to the presenter client device includes the screenshot with the visual marker.

13. The electronic communication system of claim 10, wherein the collaboration service compares the received question report with a previously received question report to determine whether the received question report is duplicative of the previously received question report and when duplicative combining the received question report with the previously received question report prior to the transmitting of the question report to the presenter client device.

14. The electronic communication system of claim 13, wherein the comparing comprises performing natural language processing (NLP) on the user input content to determine whether user input content in the previously received question report is a match.

15. The electronic communication system of claim 14, wherein the comparing further comprises at least one of determining whether a timestamp provided in the received question report is within a predefined time window containing a timestamp of the previously received question report and, when the received question report includes cursor coordinates on the display corresponding to the user interaction, determining whether the coordinates are within a predefined distance from cursor coordinates in the previously received question report.

16. The electronic communication system of claim 10, wherein the question list report comprises a plurality of question reports from the participant client device and additional participant client devices participating in the online communications session, wherein the plurality of question reports are arranged chronologically by timestamps indicating when the participant client devices were operated to select a portion of the presentation content to comment upon, and wherein the presenter client device is operable to display one of the question reports including an identifier of the portion of the presentation content and the user input content.

17. A method of summarizing questions during an online conference comprising:
with a server linked to a communications network, receiving a question report from a participant client device participating in a web-based collaboration session involving sharing of presentation content, wherein the question report includes identification data of a portion of the presentation content and user input content associated with the portion of the presentation content;
comparing the received question report with a previously received question report to determine whether the received question report is adequately correlated to the previously received question report and, if adequately correlated, combining the received question report with the previously received question report to create a combined question report;
with the server, transmitting the received question report or the combined question report to a presenter client device sharing the presentation content for access during the collaboration session; and
prior to receiving the question report, displaying the presentation content on a display screen of the participant client device, responding to a user interaction with the display screen during the displaying by collecting a timestamp and a cursor coordinates associated with the user interaction and further by displaying a screenshot of the presentation content displayed at a time matching the timestamp along with a dialog box, receiving the user input content via the dialog box, and transmitting the question report to the server including the timestamp, the cursor coordinates, the screenshot, and the user input content.

18. The method of claim 17, wherein the comparing step comprises performing natural language processing (NLP) on the user input content to determine whether user input content in the previously received question report is a match.

19. The method of claim 17, wherein the identification data includes a timestamp and a screenshot of the presentation content displayed on a display of the one of the participant client devices at a time matching the timestamp, wherein the identification data further includes cursor coordinates on the display corresponding to a user interaction with the presentation content of the screenshot at the time matching the timestamp, and further including modifying the screenshot to include a visual marker at a location based on the coordinates.

20. The method of claim 19, wherein the comparing step comprises at least one of determining whether the timestamp is within a predefined time window containing a timestamp of the previously received question report and determining whether the coordinates are within a predefined distance from cursor coordinates in the previously received question report.

* * * * *